July 10, 1934.    G. E. PARKER    1,965,989
HUB AND BRAKE DRUM CONSTRUCTION
Filed Feb. 18, 1932    2 Sheets-Sheet 1
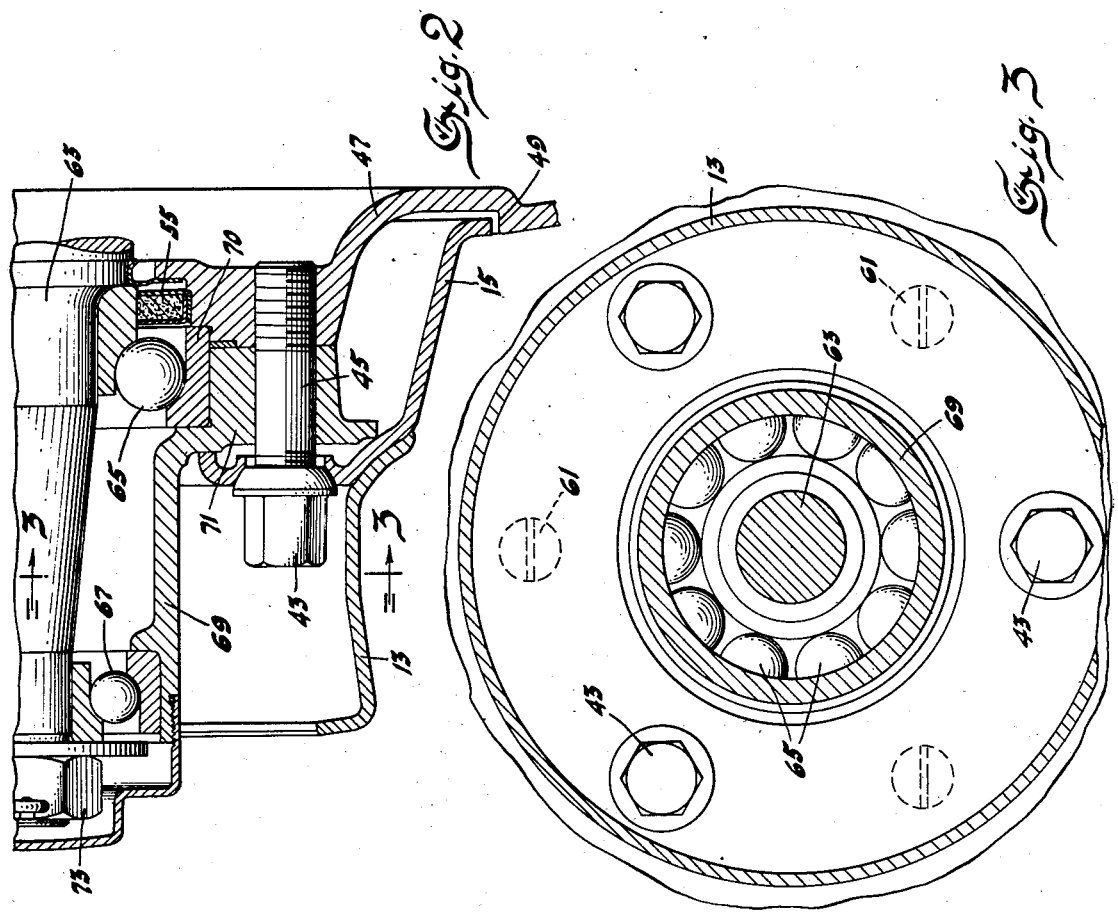
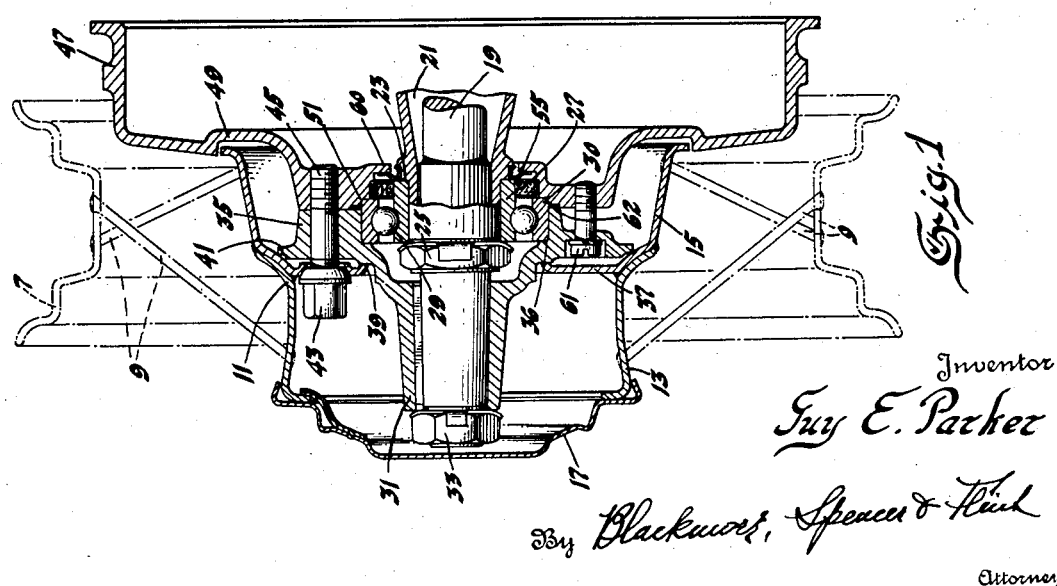
Inventor
Guy E. Parker
By Blackmore, Spencer & Hulh
Attorneys Inventor
Guy E. Parker
By Blackmore, Spencer & Flint
Attorneys Patented July 10, 1934

1,965,989

UNITED STATES PATENT OFFICE 1,965,989

HUB AND BRAKE DRUM CONSTRUCTION

Guy E. Parker, Birmingham, Mich., assignor to General Motors Corporation, Detroit, Mich., a corporation of Delaware Application February 18, 1932, Serial 593,759

3 Claims. (Cl. 180—75)

This invention relates to wheels and more particularly to a wheel and brake drum assembly for use on motor vehicles.

An object of the invention is to provide an improved combination of wheel and brake drum.

Another object is to provide an improved means to locate the brake drum in concentric relation to the wheel.

Another object is to provide a construction facilitating the use of a brake drum interchangeable for front and rear wheels.

Another object is to provide means for retaining a brake drum relative to an inner wheel hub when the wheel with its outer hub is removed.

Other objects and advantages will appear from the following description.

In the drawings accompanying this description—

Fig. 1 is a transverse section through a driven wheel embodying my invention.

Fig. 2 is an enlarged sectional view showing the invention applied to a wheel mounted on a steering stub axle.

Fig. 3 is a section on line 3—3 of Fig. 2.

Figure 4:
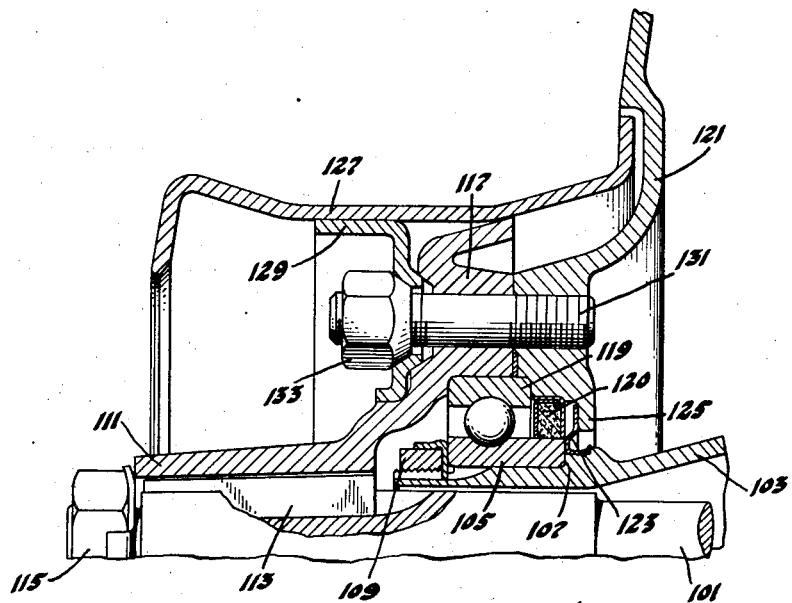
Fig. 4 is a transverse section of my invention applied to a modified form of wheel, this figure showing the invention associated with a driven wheel.

Reference is first made to Figs. 1-3 inclusive. A wheel of known kind is shown as having a rim 7, spokes 9, and an outer wheel hub 11. The wheel hub 11 is formed from two parts 13 and 15 welded together as shown. The outer part 13 may be provided at its open end with a cap 17.

In the case of the driving wheel the live axle 19 extends through and beyond its housing 21. Adjacent the end of the housing is a shoulder 23 receiving an inner race 27. This race, at its outer end, is held by a retainer and nut 25. The bearing is completed by an outer race 30 and the included balls 29. Secured to the end of the driving axle is an inner hub 31 fastened by a retainer and nut 33. The hub 31 is formed with a flange 35 provided with a shoulder 36 whereby it engages the end of the outer race 30 and also engages a part of the outer face of the said outer race. At 37 is an inner ring constituting a portion of part 15 of the wheel. It is formed to overlie flange 35 and to be out of contact therewith except in the circular regions of contact at 39 and 41. At spaced intervals the ring portion 37 is formed with openings having conical walls. Similarly shaped nuts 43 are threaded on driving studs 45 which studs pass through openings provided therefor in the flange 35.

The brake drum is represented by numeral 47. It has a shoulder 49 adjacent the outer marginal wall of part 15 of the outer wheel hub. The inner hub portion of the drum is formed with a shoulder as at 51 whereby this portion of the drum may be assembled over the outer surface of bearing race 30 and also engage the inner side thereof. This inner drum hub is provided with openings registering, when the drum is assembled on the outer race 30, with the holes in the inner wheel hub formed to receive the driving studs 45. These studs may be secured, as by being threaded, into the brake drum as shown.

The extreme inner portion of the drum hub is represented by numeral 60. It is there provided with a guard axially spaced from a suitable packing ring 55 to prevent the escape of lubricant from the region of the bearing.

To prevent the separation of the brake drum 47 with the driving studs from the inner wheel hub 31 when the nuts 43 are removed for the purpose of removing the wheel there are cap screws 61 extending through the inner wheel hub flange 35 at points symmetrically disposed and located between the driving lugs as best shown by Fig. 3. These cap screws are threaded into the drum hub flange as shown, and for the sake of reducing the weight of the inner hub the material may be cut away from the hub in the region of the cap screws. It is not intended that these cap screws shall assume the drive, their only purpose being to hold the hub and inner drum assembled when the wheel is removed. It will be observed also that the heads of the cap screws are located beneath the portion 37 of the outer wheel hub when the parts are assembled.

By the construction described it will be seen that the wheel may be removed with no possibility of the separation of the brake drum from the inner wheel hub. The nuts on the driving studs clamp the inner hub 35 between the ring member 37 of the wheel proper and the brake drum hub. Preferably the brake drum hub may be provided with a reduced portion to receive a gasket 62 between the said brake drum hub and the inner wheel hub 35. Since both the wheel hub and the brake drum are assembled on the outer race the correct centering of the drum on the inner wheel is insured.

Figs. 2 and 3 show the same wheel and brake drum mounted on a stub axle. The axle 63 supports, by means of bearings 65 and 67, the inner hub 69, the flange 71 of which axially engages and overlies the outer race 70 of the bearing 65. The same brake drum 47 is associated with the flange 71 of the hub 69 in just the same way as was described in connection with Fig. 1. The driving studs 45 with the nuts 43 and the cap screws 61 are shown in this embodiment. Here again it will be seen that the brake drum flange is centered relative to the wheel hub by being assembled over the bearing race 70.

It will be readily understood that the use of similarly dimensioned bearings for the front and rear wheels permits the use of similarly dimensioned and interchangeable drums for both front and rear wheels, and that when assembled the drums will be in every case in correct position relative to the wheels. This is well shown in Figs. 4 and 5 which illustrate another kind of wheel, but with which my invention is employed. Here the live axle 101 is shown located in housing 103. The inner race 105 is held against a shoulder 107 by a retainer and a nut 109 threaded on the end of the housing. The inner wheel hub 111 is keyed to the live axle 101 at 113 and is held by a retainer and nut 115. The flange 117 engages the end of and the outer face of the outer race 119 of the bearing as before. The brake drum 121 is also assembled around the outer race 119 and also engages its inner end. There is provided a suitable packing 120 and guard 123 substantially as before, this guard being similarly associated with the inwardly directed end 125 of the brake drum.

Figure 5:
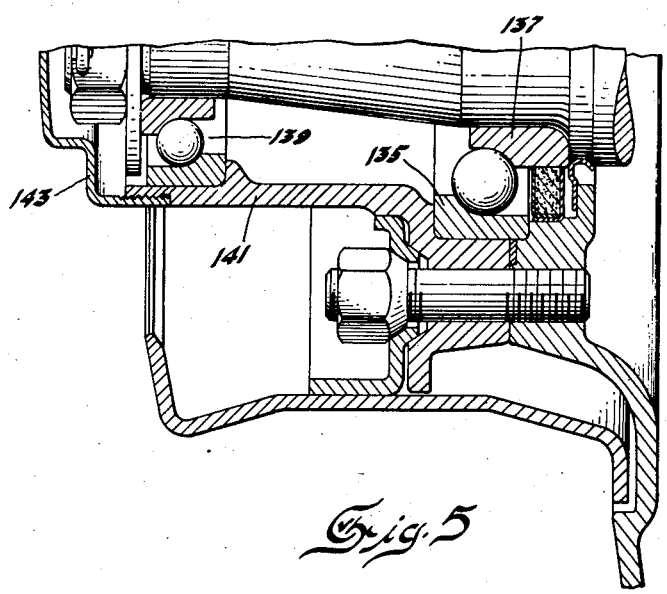
Fig. 5 is a transverse section showing the same type of wheel and embodying my invention mounted on a steering stub axle.

A wheel hub 127 has secured thereto a ring 129. The driving studs are shown at 131 threaded into the drum hub. These studs pass freely through the inner hub 117 and receive nuts 133 which have conical faces in engagement with conical depressions formed in the ring 129. Cap screws, although not illustrated in these figures, alternate with the studs 131 as in the other form of the invention. This type of wheel is shown in Fig. 5 on a stub axle. The same wheel and drum may be employed inasmuch as the outer race 135 corresponds in dimensions with the outer race 119 of the bearing used on the axle housing as shown in Fig. 4. In this form of the invention the outer bearing 139 obviously cooperates with the inner bearing 137 in rotatably supporting the inner hub 141 to which is threaded the hub cap 143. In other respects the construction is the same and will be seen to embody the same advantages.

I claim:

1. In combination, a support, an inner wheel hub having a flange, an outer wheel hub, an anti-friction bearing between the support and the inner hub flange, said inner wheel hub flange being assembled on the periphery of a race of said bearing, a brake drum having a hub also assembled on the periphery of said bearing race, and means to secure said inner wheel hub to said brake drum hub, said last-named means comprising driving studs secured to the brake drum hub, passing through the inner wheel hub and provided with nuts on said studs to clamp the outer wheel hub beneath said nuts and to said inner wheel hub and brake drum hub and means independent of said driving studs to hold said inner wheel hub and brake drum hub assembled when the wheel is removed.

2. In combination, a live axle, an axle housing, an inner wheel hub secured to said live axle, an outer wheel hub, said inner wheel hub having a flange, a bearing having an inner race mounted on said housing, said inner wheel hub flange recessed to engage the periphery of the outer race of said bearing, a brake drum having a hub provided with a recessed portion peripherally engaging said outer bearing race, means extending through said inner wheel hub and brake drum to secure said parts together, and other securing means extending through the said parts and through the outer wheel hub to secure said inner wheel hub and brake drum to the outer hub portion of the wheel.

3. In combination, a support, an inner wheel hub having a flange, an outer wheel hub constituting a part of a wheel and removable therewith from said inner wheel hub, an anti-friction bearing between the support and the inner hub flange, said inner wheel hub flange being assembled on the periphery of a race of said bearing, a brake drum having a hub also assembled on the periphery of said bearing race, and means to secure said inner wheel hub to said brake drum hub, said last-named means comprising driving studs in threaded engagement with the brake drum hub, passing through the inner wheel hub and provided with nuts on said studs to clamp the outer wheel hub beneath said nuts and to said inner wheel hub and brake drum hub.

GUY E. PARKER.